United States Patent
Adir et al.

(10) Patent No.: US 10,831,785 B2
(45) Date of Patent: Nov. 10, 2020

(54) IDENTIFYING SECURITY BREACHES FROM CLUSTERING PROPERTIES

(71) Applicant: International Business Machines Corporation, Armonk, NY (US)

(72) Inventors: Allon Adir, Kiryat Tivon (IL); Ehud Aharoni, Kfar Saba (IL); Lev Greenberg, Haifa (IL); Oded Margalit, Ramat Gan (IL); Rosa Miroshnikov, On (CA); Oded Sofer, Midreshet Ben Gurion (IL); Boris Rozenberg, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 15/095,177

(22) Filed: Apr. 11, 2016

(65) Prior Publication Data
US 2017/0295189 A1    Oct. 12, 2017

(51) Int. Cl.
G06F 16/28     (2019.01)
H04L 29/06     (2006.01)
G06N 20/00     (2019.01)

(52) U.S. Cl.
CPC ........... G06F 16/285 (2019.01); G06N 20/00 (2019.01); H04L 63/1416 (2013.01); H04L 63/1425 (2013.01)

(58) Field of Classification Search
CPC ............. H04L 63/1416; H04L 63/1425; G06F 17/30598; G06F 16/285; G06N 99/005; G06N 20/00
See application file for complete search history.

(56) References Cited

U.S. PATENT DOCUMENTS

| 8,544,087 B1 | 9/2013 | Eskin et al. |
| 9,166,993 B1 | 10/2015 | Liu |
| 2009/0018983 A1 | 1/2009 | El-Rafei et al. |
| 2009/0292743 A1* | 11/2009 | Bigus .................. G06F 21/316 |

(Continued)

OTHER PUBLICATIONS

Prasanta Gogoi., "Anomaly Detection Analysis of Intrusion Data using Supervised & Unsupervised Approach", Journal of Convergence Information Technology vol. 5, No. 1, Feb. 2010.

(Continued)

*Primary Examiner* — Linglan E Edwards
*Assistant Examiner* — Forrest L Carey
(74) *Attorney, Agent, or Firm* — Gregory J. Kirsch

(57) ABSTRACT

Embodiments of the present invention may provide the capability to identify security breaches in computer systems from clustering properties of clusters generated based on monitored behavior of users of the computer systems by using techniques that provide improved performance and reduced resource requirements. For example, behavior of users or resources may be monitored and analyzed to generate clusters and train clustering models. Labeling information relating to some user or resource may be received. When users or resources are clustered and when a cluster contains some labeled users/resources then an anomaly score can be determined for a user/resource belonging to the cluster. A user or resource may be detected to be an outlier of at least one cluster to which the user or resource has been assigned, and an alert indicating detection of the outlier may be generated.

12 Claims, 2 Drawing Sheets

(56) References Cited

U.S. PATENT DOCUMENTS

| | | |
|---|---|---|
| 2011/0252032 A1* | 10/2011 | Fitzgerald ............... H04L 63/20 |
| | | 707/737 |
| 2012/0137367 A1 | 5/2012 | Dupont et al. |
| 2014/0201208 A1* | 7/2014 | Satish ................... G06F 21/564 |
| | | 707/737 |
| 2015/0067845 A1 | 3/2015 | Chari et al. |
| 2017/0103203 A1* | 4/2017 | Sharma ................. G06F 21/552 |
| 2017/0134404 A1* | 5/2017 | Machlica ............ H04L 63/1416 |

OTHER PUBLICATIONS

Iwan Syarif et al., "Unsupervised clustering approach for network anomaly detection", Networked Digital Technologies vol. 293 of the series Communications in Computer and Information Science pp. 135-145, 2012.

* cited by examiner

IDENTIFYING SECURITY BREACHES FROM CLUSTERING PROPERTIES

BACKGROUND

The present invention relates to techniques for identifying security breaches in computer systems from clustering properties of clusters generated based on monitored behavior of users of the computer systems.

Security breaches of computer systems are a problem that is increasing in frequency and scope. Detecting such security breaches is an importing aspect in protecting against such breaches. A number of techniques have been devised to detect security breaches. For example, rule-based security techniques may enforce specified security rules. For example, a non-admin person may not be able to perform operations that are only allowed to admins. As another example, supervised security tools may require a user to provide "labels" to the analyzed behavioral information, such as known signatures of malware applications, so that the tool can "learn" the correspondence between data features and the label and so be able to predict the label for new unlabeled data. As another example, unsupervised security tools do not require pre-specified rules or labels. Instead, unsupervised security tools may try to detect possible breaches by learning the normal behavior of persons or resources based on monitored past behavior.

Each of these techniques has strengths and weaknesses. For example, some techniques may miss suspicious behavior, some techniques may flag behavior that is not suspicious, and some techniques require large amounts of computing resources to function effectively. Accordingly, a need arises for a technique that provides improved performance and reduced resource requirements.

SUMMARY

Embodiments of the present invention may provide the capability to identify security breaches in computer systems from clustering properties of clusters generated based on monitored behavior of users of the computer systems by using techniques that provide improved performance and reduced resource requirements.

According to an embodiment of the present invention, a computer-implemented method of identifying security breaches in a computer system comprises monitoring behavior of users or resources of at least one computer system and storing information on the monitored behaviors, analyzing the stored information on the monitored behaviors to generate clusters and train clustering models, receiving information relating to labeling to a user or resource, determining and scoring anomalies between a user or resource and at least one cluster to which the user or resource has been assigned, detecting a user or resource to be an outlier of at least one cluster to which the user or resource has been assigned, and generating an alert indicating detection of the outlier.

According to an embodiment of the present invention, the clusters may be generated based on the stored information on the monitored behaviors without using labeling information. Outliers may be detected using the labeling information. An alert may not be generated until an anomaly score of a user or resource reaches a threshold value. The anomaly score of a user or resource may be increased if the user or resource has labeling information or labelled behavior different than labeling information or labelled behavior of a majority of users or resources assigned to a cluster to which the user or resource is assigned. The anomaly score of a user or resource may be increased when a cluster assignment of the user or resource is moved to a differently labeled cluster, or when the user or resource is first assigned to a cluster.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present invention may provide the capability to identify security breaches in computer systems from clustering properties of clusters generated based on monitored behavior of users of the computer systems by using techniques that provide improved performance and reduced resource requirements. Although for simplicity the following discussion describes only user behavior and models, it should be understood that the discussion is equally applicable to resource behavior and models.

Figure 1:
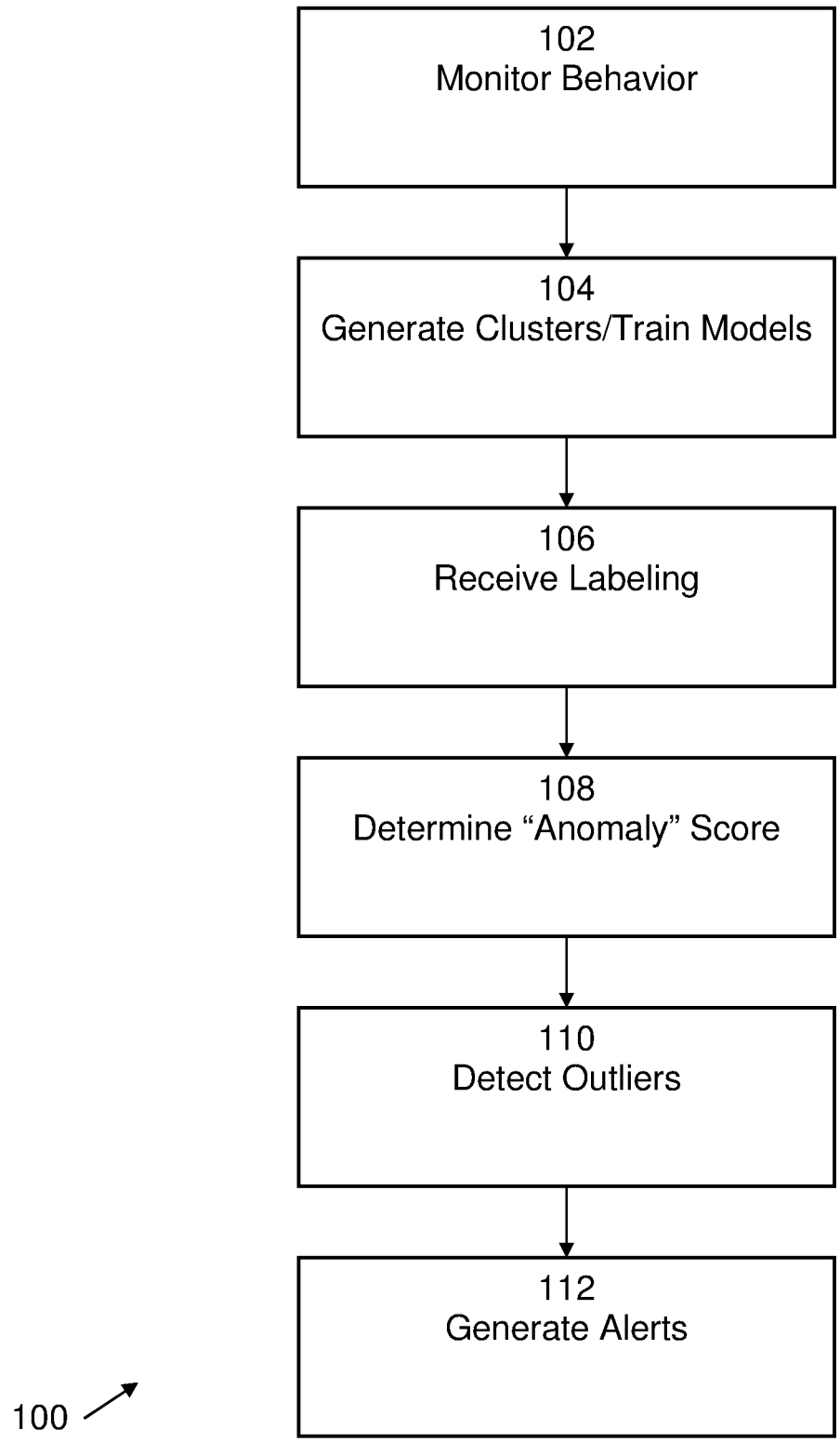
FIG. 1 is an exemplary process flow diagram of an embodiment of identifying security breaches in computer systems from clustering properties of clusters generated based on monitored behavior of users of the computer systems.

Referring to FIG. 1, an example of a process 100 of identifying security breaches from clustering properties is shown. Process 100 begins with monitoring behavior 102 of users of one or more computer systems and storing information on the monitored behaviors. A number of behaviors may be monitored. For example, behaviors such as accessing a specific database, accessing or communication on a particular network, or specified web activities.

The stored information on the monitored behaviors may be analyzed to generate clusters and train clustering models 104. Users may be assigned to clusters based on one or more features of the behaviors of the users. In one embodiment, the clusters are generated without using any labels that may have been assigned to the user. This may prevent non-useful clustering. For example, if clusters were generated using labels, all the users labeled as admins would be clustered together, rather than clustered based on their behavior. Thus, the clustering may be based on a general similarity of unlabeled behavior, for example, average volumes of data transferred, working hours, table usage patterns, access to new resources, an amount of errors, etc.

The clustering and the training of the models may typically be performed periodically (for example, once a week) so as to maintain stability. Also, models may only be used when they are based on enough historical behavioral information so that they have valid statistical significance. Confidence level is a typical statistical technique used to select the required amount of historical data and its statistical significance.

Labeling that may be provided by a user to some members of the cluster may be received 106. Examples of such labeling may include organizational roles, such as a user's department, a user's admin levels, or aspects of a user's behavior. For example, tables containing sensitive data may be labeled, and thus behavior that includes various types of accesses to such sensitive data tables may also be identifiable.

An "anomaly" score may be determined 108. For example, the anomaly score can be increased if a user is labeled differently than the label of a majority users in one or more clusters that include that user. Examples of reasons to increase the anomaly score may include an admin user in a cluster of mostly non-admin users, an admin user in a clusters of admin users of a different security level, or a non-admin user in cluster of admin users. As another example, the "anomaly" score may be increased if a user has "labeled" behavior, such as accessing sensitive data that is different than a majority users in one or more clusters that include that user. Further, the anomaly score may be increased when the user's cluster assignment moves into a differently labeled cluster, or when the user is first assigned to a cluster.

In an embodiment, the data is clustered using one set of features and then outliers are detected 110 within the resulting clusters using a second set of features, such as labels on the data. For example, clusters may be generated without using labels, such as "Admin," and a user may be detected as an outlier in its cluster if it is labeled differently than the majority of the cluster.

As another example, users may be clustered based on some behavioral aspects, such as the rarity of some activity types in the user's behavioral history. Other behavioral aspects may be measured for all cluster members, such as the average hourly volume of the activity types, or the time-of-day of the activities. The other behavioral features may be used to detect anomalous users within each cluster. For example, a user assigned to a cluster based on one behavioral aspect, who has another behavioral aspect that is significantly different than that of other users in the cluster may be determined to be an outlier.

Examples of anomaly detection techniques that may be used to detect the outliers within the clusters may include measuring the average and standard-deviation of the hourly volume of the activity types for all the users in the cluster, as long as this behavioral aspect was not used to perform the clustering itself. Standard statistical techniques like z-score may be used for detecting outliers. For example, if a user's behavioral aspect is measured as being "too many" standard deviations away from the average (or median), then the user may be considered an outlier.

Alerts may be generated 112 to indicate or otherwise inform the appropriate entities that outliers have been detected and that these outliers may represent security breaches. In one example, detection of an outlier may directly cause an alert to be generated. For example, an alert may indicate that a non-admin user was clustered with admin only users. As another example, to reduce the rate of false alerts, detection of an outlier may cause the anomaly score to be increased. In this example, an alert would be generated once the total anomaly score reached some threshold. Thus, an alert would be given only if a number of suspicious events occur, such as suspicious clustering (outliers) occurs together with other suspicious events. For the second case, once the non-admin user clustered with only admin users and then performs additional suspicious activities, such as volume transactions, the alert may be generated. In this case even a moderate volume of transactions above average may generate an alert, even though such activity may not trigger an alert for a non-suspicious clustering outlier.

Such alerts may, for example, include "installation day alerts," in which breach was ongoing at the time the described security monitoring began, and may include alerts that occur later once the breach begins to occur.

Figure 2:
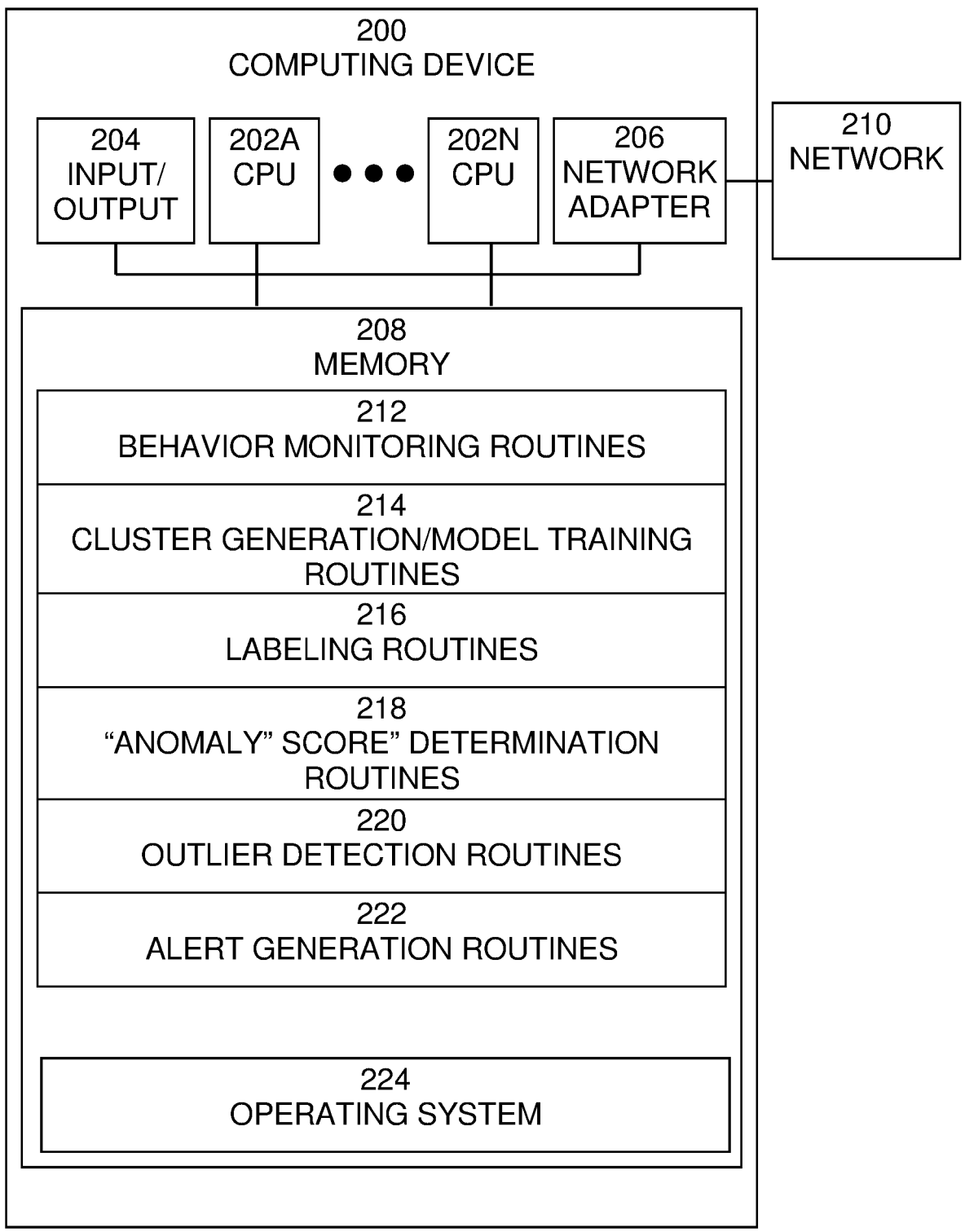
FIG. 2 is an exemplary block diagram of a computer system in which processes involved in the system, method, and computer program product described herein may be implemented.

An exemplary block diagram of a computer system 200, in which the processes involved in the system, method, and computer program product described herein may be implemented, is shown in FIG. 2. Computer system 200 is typically a programmed general-purpose computer system, such as a personal computer, workstation, server system, and minicomputer or mainframe computer. Computer system 200 may include one or more processors (CPUs) 202A-202N, input/output circuitry 204, network adapter 206, and memory 208. CPUs 202A-202N execute program instructions in order to carry out the functions of the present invention. Typically, CPUs 202A-202N are one or more microprocessors, such as an INTEL PENTIUM® processor. FIG. 2 illustrates an embodiment in which computer system 200 is implemented as a single multi-processor computer system, in which multiple processors 202A-202N share system resources, such as memory 208, input/output circuitry 204, and network adapter 206. However, the present invention also contemplates embodiments in which computer system 200 is implemented as a plurality of networked computer systems, which may be single-processor computer systems, multi-processor computer systems, or a mix thereof.

Input/output circuitry 204 provides the capability to input data to, or output data from, computer system 200. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces device 200 with a network 210. Network 210 may be any public or proprietary LAN or WAN, including, but not limited to the Internet.

Memory 208 stores program instructions that are executed by, and data that are used and processed by, CPU 202 to perform the functions of computer system 200. Memory 208 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 208 varies depending upon the function that computer system 200 is programmed to perform. For example, as shown in FIG. 1, computer systems may perform a variety of roles in the system, method, and computer program product described herein. For example, computer systems may perform one or more roles as users, validators, auditors, and/or identity providers. In the example shown in FIG. 2, exemplary memory contents are shown representing routines for all of these roles. However, one of skill in the art would recognize that these routines, along with the memory contents related to those routines, may be included on one system, or may be distributed among a plurality of systems, based on well-known engineering considerations. The present invention contemplates any and all such arrangements.

In the example shown in FIG. 2, memory 208 may include behavior monitoring routines 212, cluster generation/model training routines 214, labeling routines 216, "anomaly" score determination routines 218, outlier detection routines 220, alert generation routines 222, and operating system 224. Behavior monitoring routines 212 may include routines to monitor behavior of users of one or more computer systems and store information on the monitored behaviors. Cluster generation/model training routines 214 may include routines to assign users to clusters based on one or more features of the behaviors of the users. Labeling routines 216 may include routines to receive labeling information that may be provided by a user to some members of the cluster. Anomaly score determination routines 218 may include routines to raise anomaly scores of a user based on behaviors and labels of the user. Outlier detection routines 220 may include routines to identify outlier users from clusters of user's behaviors and labels of the users. Alert generation routines 222 may include routines to generate alerts indicate or otherwise inform the appropriate entities that outliers have been detected and that these outliers may represent security breaches. Operating system 224 provides overall system functionality.

As shown in FIG. 2, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of identifying security breaches in a computer system comprising:
    monitoring behavior of users or resources of at least one computer system and storing unlabeled information on the monitored behaviors;
    analyzing the stored unlabeled information on the monitored behaviors to generate clusters and train clustering models, wherein each user or resource is assigned to at least one cluster based on an unlabeled first feature of the behaviors;
    receiving information relating to a second feature of the behaviors of a user or resource, wherein the second feature is different than the first feature that was used to assign each user or resource to at least one cluster, and wherein the information relating to the second feature is a label of the user or resource;
    detecting at least one outlier within the clusters generated using the first feature by:
    generating an anomaly score between a user or resource and at least one cluster to which the user or resource has been assigned, wherein an anomaly score for the user or resource is increased when the second feature for the user or resource is different than the second features for a majority of other users or resources assigned to the at least one cluster;
    detecting a user or resource to be an outlier of at least one cluster to which the user or resource has been assigned based on the anomaly score of a user or resource; and
    generating an alert indicating detection of the outlier.

2. The method of claim 1, wherein the first feature does not include labeling information.

3. The method of claim 1, wherein an alert is not generated until an anomaly score of a user or resource reaches a threshold value.

4. The method of claim 3, wherein the anomaly score of a user or resource is increased when a cluster assignment of the user or resource is moved to a differently labeled cluster, or when the user or resource is first assigned to a cluster.

5. A system for identifying security breaches in a computer system, the system comprising a processor, memory accessible by the processor, and computer program instructions stored in the memory and executable by the processor to perform:
    monitoring behavior of users or resources of at least one computer system and storing unlabeled information on the monitored behaviors;
    analyzing the stored unlabeled information on the monitored behaviors to generate clusters and train clustering models, wherein each user or resource is assigned to at least one cluster based on an unlabeled first feature of the behaviors;
    receiving information relating to a second feature of the behaviors of a user or resource, wherein the second feature is different than the first feature that was used to assign each user or resource to at least one cluster, and wherein the information relating to the second feature is a label of the user or resource;
    detecting at least one outlier within the clusters generated using the first feature by:
    generating an anomaly score between a user or resource and at least one cluster to which the user or resource has been assigned, wherein an anomaly score for the user or resource is increased when the second feature for the user or resource is different than the second features for a majority of other users or resources assigned to the at least one cluster;
    detecting a user or resource to be an outlier of at least one cluster to which the user or resource has been assigned based on the anomaly score of a user or resource; and
    generating an alert indicating detection of the outlier.

6. The system of claim 5, wherein the first feature does not include labeling information.

7. The system of claim 5, wherein an alert is not generated until an anomaly score of a user or resource reaches a threshold value.

8. The system of claim 7, wherein the anomaly score of a user or resource is increased when a cluster assignment of the user or resource is moved to a differently labeled cluster, or when the user or resource is first assigned to a cluster.

9. A computer program product for identifying security breaches in a computer system, the computer program product comprising a non-transitory computer readable storage having program instructions embodied therewith, the program instructions executable by a computer, to cause the computer to perform a method comprising:

monitoring behavior of users or resources of at least one computer system and storing unlabeled information on the monitored behaviors;

analyzing the stored unlabeled information on the monitored behaviors to generate clusters and train clustering models, wherein each user or resource is assigned to at least one cluster based on an unlabeled first feature of the behaviors;

receiving information relating to a second feature of the behaviors of a user or resource, wherein the second feature is different than the first feature that was used to assign each user or resource to at least one cluster, and wherein the information relating to the second feature is a label of the user or resource;

detecting at least one outlier within the clusters generated using the first feature by:

generating an anomaly score between a user or resource and at least one cluster to which the user or resource has been assigned, wherein an anomaly score for the user or resource is increased when the second feature for the user or resource is different than the second features for a majority of other users or resources assigned to the at least one cluster;

detecting a user or resource to be an outlier of at least one cluster to which the user or resource has been assigned based on the anomaly score of a user or resource; and generating an alert indicating detection of the outlier.

10. The computer program product of claim 9, wherein the first feature does not include labeling information.

11. The computer program product of claim 9, wherein an alert is not generated until an anomaly score of a user or resource reaches a threshold value.

12. The computer program product of claim 11, wherein the anomaly score of a user or resource is increased when a cluster assignment of the user or resource is moved to a differently labeled cluster, or when the user or resource is first assigned to a cluster.

\* \* \* \* \*